May 24, 1960  J. M. MEEK  2,938,087
PELLET ACCELEROMETER

Filed Aug. 27, 1959  2 Sheets-Sheet 1

INVENTOR
JAMES M. MEEK
BY S. J. Rotondi, A. J. Dupont,
F. E. McGee & J. P. Edgerton

United States Patent Office 2,938,087
Patented May 24, 1960

2,938,087

PELLET ACCELEROMETER

James M. Meek, Silver Spring, Md., assignor to the United States of America as represented by the Secretary of the Army Filed Aug. 27, 1959, Ser. No. 836,557

5 Claims. (Cl. 200—61.45)

(Granted under Title 35, U.S. Code (1952), sec. 266)

The invention described herein may be manufactured and used by or for the Government for governmental purposes without the payment to me of any royalty thereon.

This invention relates to acceleration-responsive control devices in general, and more specifically to a pellet accelerometer which closes an arming or control switch some predetermined time after the accelerometer experiences sustained acceleration as a result of missile launching.

Known prior art pellet accelerometers are used to arm a missile after the missile is launched and ensure that the missile will not arm unless it experiences sustained acceleration for some predetermined period of time. Such accelerometers utilize the flow of spherical pellets through an orifice to govern the accelerative movement of a piston. The pellets and the piston both move under the influence of sustained acceleration. After the piston moves a predetermined distance, it arms the missile by closing an arming or control switch or by releasing a linkage which permits the arming switch to close. One such pellet accelerometer is disclosed in U.S. Patent No. 2,854,539.

One disadvantage of known pellet accelerometer systems is that the piston is capable of moving to a position where the accelerometer arms the missile prematurely when the accelerometer experiences continuous vibration or shock. This is because these accelerometers utilize the hour-glass principle and position the orifice concentrically to the piston with the result that the piston pushes the pellets through the orifice when the piston experiences continuous vibration or shock.

Another disadvantage of known prior art pellet accelerometer systems is that a spring is generally required to prevent movement of the piston against the pellets. This arrangement of the piston and spring requires that the spring be of some predetermined resilience because the characteristics of the spring determine the movement of the piston when the system is subjected to acceleration and the movement of the piston effects time-delay arming of the missile. Thus the spring must be carefully manufactured within narrow tolerances. Should the spring fail the piston would be free to force the pellets prematurely through the orifice in response to minor shocks or vibrations.

Therefore, it is an object of this invention to provide an improved pellet accelerometer which overcomes the above-described disadvantages of known prior art pellet accelerometer systems.

According to this invention, a pellet accelerometer is provided which ensures safety against shocks and impacts acting on the accelerometer from any direction. In addition, failure of the coil spring which is used in combination with the piston will not cause premature arming of the system. Variations in the resilience of the spring have practically no effect upon the time-delay characteristics of the accelerometer.

The specific nature of the invention, as well as other objects, uses and advantages thereof, will clearly appear from the following description and from the accompanying drawing, in which.

Figure 1:
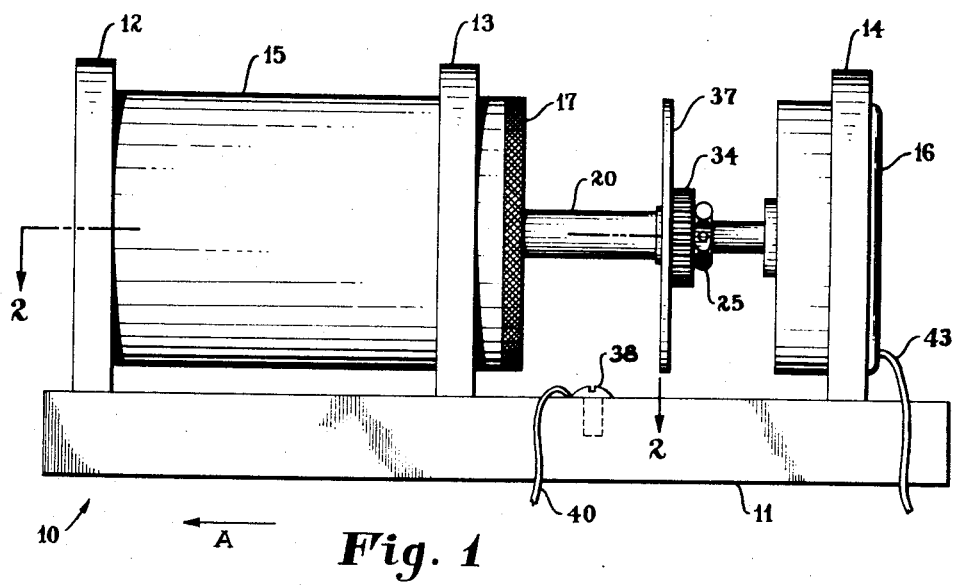
Fig. 1 is a side view of the pellet accelerometer of this invention.
Figure 2:
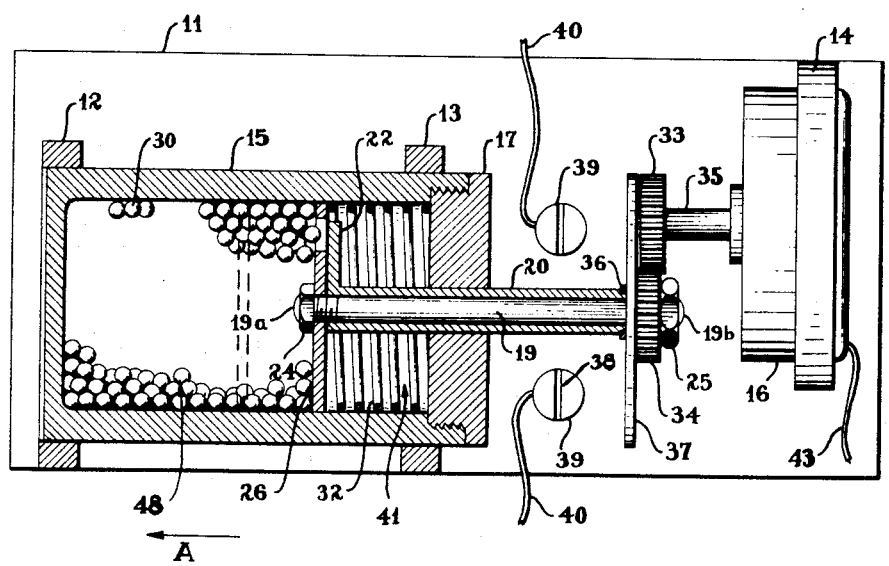
Fig. 2 is a plan view of the pellet accelerometer with certain parts shown in section by section lines 2—2 taken through Fig. 1.

Figs. 1 and 2 show the assembled pellet accelerometer which is designated by numeral 10. Accelerometer 10 includes a base 11 from which project three perpendicular supports 12, 13, and 14. Base 11 is composed of any suitable insulating material such as Bakelite. Supports 12, 13, and 14 are fixed to base 11 by machine screws (not shown) or by any other suitable fastening means. The bores of supports 12 and 13 tightly receive cylinder 15 while the bore of support 14 tightly receives cylindrical solenoid 16. When cylinder 15 and solenoid 16 are firmly inserted into the bores of supports 12 and 13 and into the bore of support 14, respectively, movement of cylinder 15 and solenoid 16 in any direction is prevented.

Cylinder 15 is substantially cup-shaped and is internally threaded at its open end to receive threaded plug 17. Plug 17 has a bore 18 in its center, which bore has a diameter large enough to house the cylindrical portion 21 of L-shaped sleeve 20.

Sleeve 20 consists of hollow cylindrical portion 21, tab 22 which extends substantially perpendicularly from the end of cylinder 21, and a necked-down end portion 41. Cylindrical portion 21 encases piston rod 19 as shown in Fig. 2. Rod 19 has ends 19a and 19b which are externally threaded so that nuts 24 and 25 can be respectively secured to these ends. Positioned between tab 22 and nut 24 is cylindrical piston 26. Piston 26 has a bore 27 through its center and this bore is slightly larger than end 19a but is smaller than the diameter of rod 19. Nut 24 when secured to end 19a presses piston 26 against annular shoulder 19c formed between threaded end 19a and the periphery of rod 19. Nut 24 thus secures piston 26 to rod 19.

Circular orifice 28 is positioned substantially intermediate the periphery and the center of piston 26. Cylindrical sleeve portion 21 which is rotatable on rod 19 is also rotatable in bore 18 in plug 17. When the accelerometer 10 is in the "safe" position the flat surface 22a of tab 22 covers orifice 28. Flat surface 22a lightly contacts surface 27b of piston 26. However, since sleeve 20 is rotatable, tab 22 can be rotated so that flat surface 22a slides over surface 27b and uncovers orifice 28. As shown in Figs. 1 and 2, the longitudinal axis of rod 19 and cylindrical portion 21 of sleeve 20 are coaxial to the axes of plug 17 and piston 26.

Spherical pellets 30 composed of a hard-surfaced material such as steel or glass fill the cavity 48 which is formed between flat circular surface 26a of piston 26 and the inner walls of cylinder 15. In one embodiment steel pellets having diameters of between .020 and .040 were used with an orifice diameter of approximately .10 inch. The ratio between orifice diameter and pellet diameter should preferably be between 3:1 and 4:1. Pellets 30 do not have to be spherical; other shapes such as oblong or out-of-round pellets may also be used. Coil spring 32 is positioned in cylindrical cavity 41 formed by the inner walls of cylinders 15, plug 17, and the flat circular surface 26b of piston 26. The longitudinal axis of coil spring 32 is substantially coaxial with the axis of cylinder 15. Plug 17 presses coil spring 32 against surface 26b urging piston 26 in the direction of arrow A (Figs. 1 and 2).

Rotation of tab 22 approximately 20 degrees in either direction on rod 19 will cause tab 22 to open orifice 28 so that pellets 30 are free to flow from cavity 48 through orifice 28 into cavity 41. Sustained acceleration in the direction of arrow A will cause the pellets to continue to flow through orifice 28.

Gear 33 (Figs. 2 and 3) is affixed to shaft 35 which will rotate when driven by solenoid 16. Solenoid 16 is a conventional Ledex solenoid which rotates when energized by any suitable electrical power source. The electrical power source may consist of a battery (not shown) which is electrically connected to lead wires 43 extending from solenoid 16. A suitable setback responsive switch (not shown) which is actuated when the missile is fired is interposed between the electrical power source and lead wires 43. These setback-actuated switches are well known in the switch and fusing arts and close only when they are subjected to a setback. One such switch is disclosed in U.S. Patent No. 2,806,914. When a force of sufficient magnitude acting in a proper direction causes the setback switch to close, a battery or other electrical power source (not shown) will energize solenoid 16.

Figure 3:
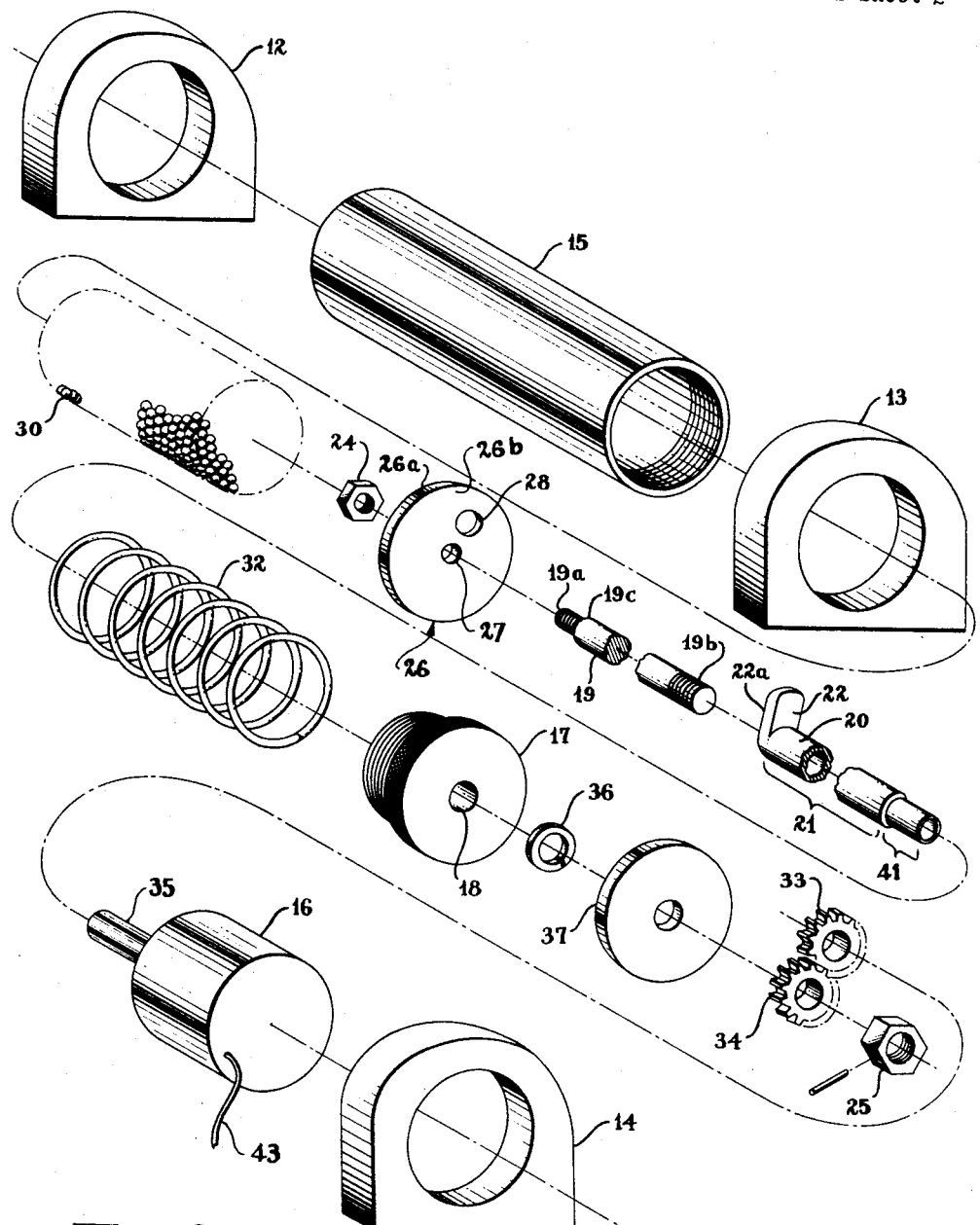
Fig. 3 is an exploded view of the accelerometer shown in Figs. 1 and 2 with the base removed.

Nut 25 presses gear 34 and contact disc 37 against spacer ring 36. These parts are mounted on necked-down portion 41 formed on sleeve 20 as shown in Fig. 3. Nut 25 when tightened on end 19b presses gear 34 and contact disc 37 against spacer ring 36 with sufficient force so that gear 34 and disc 37 are fixed to sleeve 20. Spacer ring 36 cannot move in the direction of arrow A because it abuts a shoulder formed between cylindrical portion 21 and necked-down portion 41.

Gears 33 and 34 are spur gears and both gears can therefore slide axially with respect to each other. Disc 37 has a diameter which is large enough so that the periphery of the disc will contact the rounded heads of screw contacts 39 which are fixed in insulating base 11 when the piston 27 moves in the direction of arrow A to the position shown by the dotted lines in Fig. 2. Lead wires 40 are soldered or otherwise electrically connected to contacts 39. Disc 37, contacts 39 and lead wires 40 constitute an arming or control switch which can be connected to a firing circuit of conventional type. Firing circuits are well known in the missile art and generally consist of a battery source and a detonator in series. One such circuit is disclosed in U.S. Patent No. 2,873,679. When wires 40 are electrically connected by contact disc 37 shorting contacts 39, a detonator (not shown) can be initiated by some suitable electrical power source.

The operation of the pellet accelerometer 10 of this invention is as follows. Accelerometer 10 is placed in the missile with the longitudinal axis of rod 19 positioned substantially parallel to the direction of missile acceleration which is indicated by arrow A in Figs. 1 and 2. Tab 22 initially covers orifice 28 preventing pellets 30 from flowing from cavity 40 into cavity 41. The accelerometer 10 is therefore in the "safe" position because pellets 30 cannot flow through piston 26.

When the missile is fired, setback forces will close a conventional setback-responsive switch (not shown) so that an electrical power source such as a battery (not shown) can energize solenoid 16 for a predetermined period. Solenoid 16 will thereupon rotate shaft 35, gears 33 and 34, and tab 22 until flat surface 22a uncovers orifice 28. The accelerometer is thus in the "unsafe" position because pellets 30 will then be free to flow through orifice 28 into cavity 41 under the influence of sustained acceleration. Coil spring 32 expanding against piston 26 causes the piston to move axially, that is, in the direction of arrow A. Spur gear 34 will also move axially with sleeve 20 and rod 19 until it disengages from spur gear 33.

Movement of piston 26 by coil spring 32 will continue as long as pellets 30 flow through orifice 28. When piston 26 reaches the dotted line position shown in Fig. 2, contact disc 37 will simultaneously contact heads 38 of contacts 39 thereby closing the arming circuit. The distance that the missile has travelled is a function of the distance travelled by the piston 26. Movement of piston 26 follows the law $S=a^k t$, where S is distance of missile travel before arming; $a$ is the missile acceleration; $t$ is the time of flight; and $k$ is a constant which can be determined experimentally for each accelerometer design. When this circuit is closed, a battery or other suitable electrical energy source (not shown) can fire a detonator (not shown) or otherwise effect arming of the missile as as will be evident to those in the art.

Since flat surface 22a covers orifice 28 until the missile actually receives a setback force sufficient to close a conventional setback or launch-actuated switch, pellets 30 will not flow through orifice 28 even though accelerometer 10 is subjected to shocks and vibrations in directions parallel to that shown by arrow A. The flat surface 26a bears against pellets 30 and cooperates with eccentrically positioned orifice 28 to provide an accelerometer in which the movement of piston 26 is wholly dependent upon the exodus of pellets 30 through orifice 28. When the ratio of orifice diameter to pellet diameter is chosen properly e.g. between 3:1 and 4:1 for steel pellets, the resilience of coil spring 32 has no effect upon the time when piston 22 takes to move the requisite distance to close the arming switch 39.

The actual ratio of pellet diameter to orifice diameter can be determined experimentally. The pellet diameter should be large enough to allow pellets under the influence of acceleration to pass through orifice 28, and yet not large enough to allow the pellets to be forced through by spring or piston inertial forces. The optimum diameter is that which will cause frictional interlocking of pellets to occur, preventing spring or piston inertial forces from being transmitted to the pellets in the area of the orifice. The pellets opposite the orifice, being unsupported on one side, are then free to fall through the orifice making way for pellets directly above (now also unsupported) to move opposite the orifice.

The device described may be used as a decelerometer which arms the missile or operates a control switch upon re-entry. The movement of rod 19 may be utilized to operate hydraulic valves, rotate explosive rotors, and drive gear trains because of the spring force which is available in coil spring 32.

It will be apparent that the embodiments shown are only exemplary and that various modifications can be made in construction and arrangement within the scope of the invention as defined in the appended claims.

I claim as my invention:

1. An improved pellet accelerometer responsive to acceleration and adapted to initiate arming of a missile some predetermined time after the launching thereof, said accelerometer comprising: a member having a cylindrical cavity therein, the longitudinal axis of said cavity being parallel to the direction of missile acceleration, a mass of roughly spherical pellets housed in one end of said cavity, a coil spring housed in the other end, a cylindrical piston in said cavity intermediate said pellets and said spring, said spring biasing said piston against said pellets, an orifice in said piston for passage of pellets therethrough, said pellets being of a small enough diameter to flow through said orifice in response to missile acceleration so that said piston is moved by said spring in the direction of missile acceleration, and means associated with said piston for closing an arming switch as a result of spring-biased movement of said piston in the direction of missile acceleration.

2. An improved pellet accelerometer responsive to acceleration and adapted to initiate arming of a missile some predetermined time after the launching thereof, said accelerometer comprising: a member having a cylindrical cavity therein, the longitudinal axis of said cavity being parallel to the direction of missile acceleration, a mass of spherical pellets housed in one end of said cavity, a coil spring housed in the other end, a disc-shaped piston slidable in said cavity and positioned intermediate said pellets and said spring, said spring thereby biasing said piston against said pellets, an orifice in said piston for passage of pellets therethrough, said pellets adapted to flow through said orifice so that said piston is moved by said spring in the direction of missile acceleration, and means associated with said piston for closing an arming switch as a result of a predetermined spring-biased movement of said piston in the direction of missile acceleration, a tab member rotatable from a position where it blocks the opening of said orifice to a position where said orifice is open for passage of pellets therethrough, and means for rotating said tab member from the position where it blocks said orifice when said missile is launched.

3. An improved pellet accelerometer responsive to acceleration and adapted to intiate arming of a missile some predetermined time after the launching thereof, said accelerometer comprising: a member having a cylindrical cavity therein, the longitudinal axis of said cavity being substantially parallel to the direction of missile acceleration, a piston slidable in said cavity, a mass of spherical pellets in one portion of said cavity for preventing sliding movement of said piston in one direction, spring means housed in another portion of said cavity and urging said piston in said one direction against said mass of pellets, switch means operatively connected to said piston and adapted to initiate arming of said missile when said piston moves a predetermined distance in said one direction as a result of spring bias, an annular orifice in said piston for passage of said pellets therethrough, said pellets passing through said orifice when said pellets experience missile acceleration so that said spring can move said piston said predetermined distance, and means for preventing passage of said pellets through said orifice until said missile is launched.

4. An improved pellet accelerometer responsive to acceleration and adapted to initiate arming of a missile some predetermined time after launching thereof, said accelerometer comprising: a cylinder having a cylindrical cavity therein, the longitudinal axis of said cavity being substantially parallel to the direction of missile acceleration, a cylindrical piston slidable in said cavity, a mass of spherical pellets housed in one portion of said cavity for restraining movement of said piston in one direction, a coil spring in another portion of said cavity adapted to bias said piston is said one direction against said pellets, a member rotatably mounted to the center of said piston and extending from said cavity, means adjacent said cavity adapted to initiate arming of said missile upon a predetermined movement of said piston and member in said one direction, an orifice in said piston positioned between the center and outer periphery thereof, said orifice having a diameter large enough so that said pellets can pass through said piston in response to accelerative forces produced by missile flight, and a tab extending from said member to cover said orifice and preventing passage of pellets through said orifice, and means for rotating said tab to a position where it uncovers said orifice when said missile is launched.

5. An improved pellet accelerometer responsive to acceleration and adapted to initiate arming of a missile some predetermined time after launching thereof, said accelerometer comprising: a cylinder having a cylindrical cavity therein, the longitudinal axis of said cavity being substantially parallel to the direction of missile acceleration, a cylindrical piston slidable in said cavity, the end faces of said piston being substantially perpendicular to said longitudinal axis of said cavity, a mass of spherical pellets housed in one portion of said cavity and contacting one face of said piston thereby restraining movement of said piston in one direction, a coil spring in another portion of said cavity contacting the other face of said piston and adapted to bias said piston in said one direction against said pellets, a member having first and second ends, said first end of said member extending into said cavity and rotatably mounted to the center of said piston, said second end extending outwardly from said cavity, a tab extending from said first end of said member parallel and adjacent said other face of said piston, a first spur gear fixedly mounted on the second end of said member, an electrical contact fixed to said second end of said member and adapted to close an arming switch when said piston and member move a predetermined distance in said one direction, a second spur gear in mesh with said first gear, a solenoid adapted to rotate said second gear when said missile is launched, an annular orifice in said piston positioned between the center and outer periphery thereof, said orifice having a diameter greater than the diameters of said pellets so that said pellets can flow through said piston in response to accelerative forces produced by missile flight, said tab adapted to cover said orifice and rotating to a position where said tab uncovers said orifice when said member is rotated by said solenoid as a result of missile launching, said spring moving said piston and electrical contact in said one direction while said pellets flow through said orifice, movement of said electrical contact through said predetermined distance closing said arming switch.

References Cited in the file of this patent
UNITED STATES PATENTS 2,854,539  Ruppel _____ Sept. 30, 1958